United States Patent [19]

Lockwood et al.

[11] Patent Number: 5,698,609
[45] Date of Patent: Dec. 16, 1997

[54] ENERGY ABSORBING POLYURETHANE FOAMS

[75] Inventors: Robert John Lockwood, Macomb; Brian Fogg, Rochester Hills, both of Mich.

[73] Assignee: Imperial Chemical Industries Plc, London, England

[21] Appl. No.: 749,170

[22] Filed: Nov. 14, 1996

[51] Int. Cl.$^6$ .......................... C08G 18/34; C08G 18/48
[52] U.S. Cl. ........................ 521/173; 521/159; 521/160; 521/174; 521/176
[58] Field of Search .................... 521/173, 174, 521/176, 159, 160

[56] References Cited

U.S. PATENT DOCUMENTS

| | | | |
|---|---|---|---|
| 3,931,450 | 1/1976 | Patton, Jr. et al. | 428/315 |
| 4,212,954 | 7/1980 | Nomura et al. | 521/159 |
| 4,237,240 | 12/1980 | Jarre et al. | 521/159 |
| 4,278,772 | 7/1981 | Raynor | 521/110 |
| 4,362,825 | 12/1982 | Grabhoefer et al. | 521/172 |
| 4,374,934 | 2/1983 | Raynor | 521/112 |
| 4,923,904 | 5/1990 | Hasegawa et al. | 521/115 |
| 4,987,156 | 1/1991 | Tozune et al. | 521/99 |
| 5,177,119 | 1/1993 | Motte | 121/175 |
| 5,232,957 | 8/1993 | Pritchard et al. | 521/174 |
| 5,484,820 | 1/1996 | Mispreuve et al. | 521/174 |
| 5,538,779 | 7/1996 | Mispreuve et al. | 428/220 |

FOREIGN PATENT DOCUMENTS 0116309  8/1984  European Pat. Off.

OTHER PUBLICATIONS

"Thermoformable FlexiblePolyurethane: A Unique Packaging Material", Wujcij, S.E., Yakimec, S.M., Smiecinski, T.M., 32nd Annual Polyurethane Technical/Marketing Conference, Oct. 1–4, 1989.

"MDI Slabstock Foams: A New Frontier", Elwell, R., and Thoen, J., 34th Annual Polyurethane Technical/Marketing Conference, Oct. 21–24, 1992.

*Primary Examiner*—Morton Foelak

[57] ABSTRACT

An open-celled polyurethane foam is provided having a density of 1.5 to 5.0 pcf, a G value of 30 to 80 over a static load range of 1.0 to 2.0 psi based on a 2.0 inch thickness and a 24 inch drop height and, an airflow in the range of 0.05 to 0.5 scfm, 25% as compressive strength of 4.0 psi or more prepared by a process comprising reacting, under foam forming conditions:

(a) an isocyanate-reactive component comprising
  (i) 20 to 80% of a first polyol selected from the group consisting of polyether diols, polyether triols and mixtures thereof having a molecular weight of 2000 to 10,000 and an ethylene oxide content of less than 50%; and
  (ii) 80 to 20% of a second polyol selected from the group consisting of polyether diols, polyether triols, polyester diols, polyester diols and mixtures thereof having a molecular weight of 300 to 1500 and an ethylene oxide content of less than 50%;
(b) a polyisocyanate component comprising 40 to 70% of diphenylmethane diisocyanate and 30 to 60% of polyphenylmethylene isocyanate, wherein said diphenylmethane diisocyanate comprises more than 50% by weight of the 4,4'-isomer;
(c) water in an mount of 1 to 7 parts by weight per 100 parts by weight of component (a),
  wherein components (a), (b) and (c) are reacted at an index of 90 to 130.

18 Claims, No Drawings

ENERGY ABSORBING POLYURETHANE FOAMS

FIELD OF THE INVENTION

The present invention is directed to polyurethane foams and processes for their production. More specifically, the present invention is directed to energy absorbing polyurethane foams useful for packaging applications and processes for their production.

BACKGROUND OF THE INVENTION

Fragile articles such as glass, electronic instruments, computer equipment, home appliances, etc., require special protection as they are being transported and handled. Foams, particularly polyethylene foams and urethane foams have been widely used to encapsulate and support such fragile articles. In order to provide appropriate protection, the foam must have sufficient energy absorbing characteristics to provide acceptable cushioning performance in such transportation and handling applications.

The susceptibility of articles to shock or vibration damage can be expressed in terms of a "G value". An article considered to be more susceptible to damage has a lower G value. Thus, "very delicate" articles (such as aircraft altimeters) may have a G value of about 15 to 40 G's; "delicate" articles (such as a floppy disk drives) may have a G value of about 40 to 80 G's; "moderately rugged" articles (such as TV's and VCR's) may have a G value of 80 to 100 G's; and "rugged" articles (such as furniture) may have a G value of about greater than 115 Gs.

Traditionally, polyurethane slabstock foams based upon toluene diisocyanate have been used as packaging foams. In general, such foams meet standard energy absorption requirements which cover peak acceleration G's in the range of about 20 to 100 psi. As a class of materials, polyurethane foams are particularly suited for absorbing energy in such low static stress regions where other materials, such as polyethylene or expanded polypropylene foams, do not perform as well. However, polyurethane foams based upon toluene diisocyanate have proven to be inferior with respect to their load bearing properties in comparison to other materials and are difficult to formulate.

Polyethylene foams such as the commercially available ETHAFOAM® (available from the Dow Corporation) have also been used for packaging applications. Although widely used, such polyethylene foams have proven to be unacceptable for every application due to their high cost and difficulties related to their designability.

The use of polyurethane foams based upon diphenylmethane diisocyanate (MDI) for packaging applications is also known in the art. For example, U.S. Pat. Nos. 4,374,934; 4,278,772; 4,237,240; 5,232,957; 4,362,825; 4,212,954; and 4,987,156 all disclose polyurethane foams which may be prepared from MDI having shock absorbing properties. However, it has generally been found that the cushioning performance and compressive strength of such materials do not always meet the requirements necessary to provide adequate protection to very fragile or delicate articles.

U.S. Pat. No. 5,538,779 discloses a water blown MDI-based polyurethane foam useful in packaging or shock absorbing applications. The foam disclosed in this patent has a relatively broad density and a G value of about 75 or less at a static stress greater than or equal to about 0.4 psi. However, these foams have a relatively low compressive strength, decreasing their load bearing properties, which makes them unsuitable for many applications.

Accordingly, it can be seen that there is a need for the development of a polyurethane foam which has excellent shock absorbing and cushioning characteristics having a relatively high compression strength which can be used to protect a variety of fragile and delicate articles. There is also a need for a polyurethane foam having such characteristics which further can be prepared as bun stock and can be cut to exact dimensions to provide greater design flexibility.

SUMMARY OF THE INVENTION

Accordingly, it is an object of the present invention to provide an open-celled polyurethane foam having excellent energy absorption characteristics and a relatively high compressive strength. It is a further object of the present invention to provide an energy absorbing polyurethane foam which has a high degree of design flexibility, is cost effective in comparison to conventional foams and which is recyclable.

These and other objectives of the present invention are attained by an open-celled polyurethane foam having a density of about 1.5 to about 5.0 pcf and a G value of about 30 to about 80 over a static load range of 1.0 to 2.0 psi at 2.0 inch thickness and a 24 inch drop height, an airflow in the range of 0.05 to 0.5 scfm and a 25% compressive strength of 4.0 psi or more prepared by a process comprising reacting, under foam forming conditions:

(a) an isocyanate-reactive component comprising
  (i) 20 to 80% of a first polyol selected from the group consisting of polyether diols, polyether triols and mixtures thereof having a molecular weight of about 2000 to about 10,000 and an ethylene oxide content of less than about 50%; and
  (ii) 80 to 20% of a second polyol selected from the group consisting of polyether diols, polyether triols, polyester diols, polyester triols and mixtures thereof having a molecular weight of about 300 to about 1500 and an ethylene oxide content of less than about 50%;

(b) a polyisocyanate component comprising 40 to 70% of diphenylmethane diisocyanate and 30 to 60% of polyphenylmethylene isocyanate, wherein said diphenylmethane diisocyanate comprises more than about 50% by weight of the 4,4'-isomer; and (c) water in an amount of 1 to 7 parts by weight per 100 parts by weight of component (a),
  wherein components (a), (b) and (c) are reacted at an index of 90 to 130.

The present invention is further directed to a process for the preparation of an open-celled polyurethane foam comprising reacting, under foam forming conditions:

(a) an isocyanate-reactive component comprising
  (i) a first polyol selected from the group consisting of polyether diols, polyether triols and mixtures thereof having a molecular weight of about 2000 to about 10,000 and an ethylene oxide content of less than about 50%,
  (ii) a second polyol selected from the group consisting of polyether diols, polyether triols, polyester diols, polyester triols and mixtures thereof; having a molecular weight of about 300 to about 1500 and an ethylene oxide content of less than about 50%; and
  (iii) a particulate organic polymer selected from the group consisting of styrene/acrylonitrile, polyurea and a polyisocyanate polyol adduct in a base polyether polyol having a molecular weight of about 2000 to about 10,000 and an ethylene oxide content of less than about 50%;

(b) a polyisocyanate component comprising 40 to 70% of diphenylmethane diisocyanate and 30 to 60% of polyphenylmethylene isocyanate, wherein said diphenylmethane diisocyanate comprises more than 50% by weight of the 4,4'-isomer; and (c) water in an mount of 1 to 7 parts by weight per 100 parts by weight of component (a), wherein components (a), (b) and (c) are reacted at an index of 90 to 130.

DETAILED DESCRIPTION OF THE INVENTION

The isocyanate-reactive component (a) useful in the process according to the present invention comprises at least two polyols. The first polyol (i) is selected from the group consisting of polyether diols, polyether triols and mixtures thereof. These polyether diols and polyether triols useful in the present invention have a molecular weight of about 2,000 to about 10,000, preferably about 2,500 to about 7,000 and more preferably about 3000 to about 4000. Furthermore, these polyols should have an ethylene oxide of less than about 50%, preferably less than about 25% and more preferably less than about 10%.

Examples of suitable polyether diols or triols useful as the first polyol (i) include those polyols obtained by reacting an alkylene oxide, halogen-substituted or aromatic-substituted alkylene oxide or mixtures thereof with an active hydrogen-containing initiator compound.

Suitable oxides include, for example, ethylene oxide, propylene oxide, 1,2-butylene oxide, styrene oxide, epichlorohydrin, epibromohydrin, and mixtures thereof.

Suitable initiator compounds include water, ethylene glycol, diethylene glycol, dipropylene glycol, propylene glycol, butanediol, hexanediol, glycerine, trimethylol propane, pentaerythritol, hexanetriol, hydroquinone, resorcinol, catechol, bisphenols, novolac resins, phosphoric acid and mixtures thereof.

Examples of commercially available materials suitable for use as the first polyol (i) include AKCOL® F-3020 polyether triol available from Arco Chemical Co.; POLY G® 30-56 polyoxypropylene triol available from Olin Chemicals; and KUBINOL® F428 polyoxypropylene-polyoxyethylene triol available from ICI Americas Inc.

The isocyanate-reactive component (a) further comprises a second polyol (ii) selected from the group consisting of polyether diols, polyether triols, polyester diols, polyester triols and mixtures thereof. The polyols useful as the second polyol component should have a molecular weight of about 300 to about 1500, preferably about 600 to about 1200 and more preferably about 700 to about 1000. The polyols useful as the second polyol of the isocyanate-reactive component (a) have an ethylene oxide content of less than about 50%, preferably less than about 25% and more preferably less than about 10 %. It is preferred that second polyol (ii) comprises a polyether polyol.

Examples of polyether polyols suitable for use as the second polyol (ii) of isocyanate-reactive component (a) include similar polyether polyols to those discussed above with respect to first polyol (i) but having lower molecular weights as specified.

Polyester polyols suitable for use in the present invention include those prepared by reacting a polycarboxylic acid or anhydride with a polyhydric alcohol. The polycarboxylic acids may be aliphatic, cycloaliphatic, aromatic and/or heterocyclic and may be substituted (e.g., with halogen atoms) and/or unsaturated. Examples of suitable carboxylic acids and anhydrides include succinic acid; adipic acid; suberic add; azelaic acid; sebacic acid; phthalic acid; isophthalic acid; terephthalic acid; trimellitic acid; phthalic acid anhydride; tetrahydophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids, such as those of oleic acid. Simple esters of polycarboxylic acids may also be used, such as terephthalic acid dimethyl ester, therephthalic acid bisglycol ester and mixtures thereof.

Examples of suitable polyhydric alcohols include ethylene glycol,; 1,2-propylene glycol; 1,3-propylene glycol; 1,3-, 1,4-, 1,2- and 2,3-butylene glycol; 1,6-hexane diol; 1,8-octane diol; neopentyl glycol; cyclohexane dimethanol (1,4-bis-hydroxylmethyl cyclohexane); 2-methyl-1,3-propane diol, glycerol; trimethylol propane; 1,2,6-hexane triol; 1,2,4-butane triol; trimethylol ethylene; diethylene glycol; triethylene glycol; tetraethylene glycol; polyethylene glycols; dipropylene glycol; polypropylene glycols; dibutylene glycol; polybutylene glycols and the like. The polyesters may contain some terminal carboxy groups, although preferably they are hydroxyl-terminated. It is alto possible to use polyesters of lactones such as caprolactone, or hydroxy carboxylic acids such as hydroxy caproic acid or hydroxyacetic acid.

Examples of commercially available polyols suitable for use as second polyol (ii) include polyoxypropylene triols such as ARCOL® LG-168 and ARCOL® LHT-240 and polyoxypropylene diols, such as ARCOL® PPG 725 and ARCOL® PPG 1025 available from Arco Chemical Company; and polyester polyols, such as TERATE® 2540, TERATE® 203 and TERATE® 253 available from Hoechst Celanese.

When used in this manner, the isocyanate-reactive component (a) comprises first polyol (i) in an amount of about 20 to about 80%, preferably about 30 to about 50% and more preferably about 35 to 45%. The isocyanate-reactive component (a) will comprise second polyol (ii) in an amount of about 80 to about 20%, preferably about 70 to about 50% and more preferably about 55 to about 65%.

The isocyanate-reactive component (a) may further comprise about 2 to about 40 %, preferably about 10 to about 40% and more preferably about 15 to about 40%, based on the total weight of isocyanate-reactive component (a), of (ii) a particulate organic polymer dispersed in a base polyether polyol. Such materials are often referred to as "polymer polyols" or "gaff polyols". The stated amounts refer only to the amount of organic particulate utilized in the isocyanate-reactive composition (a). The amount of base polyol used to disperse the particulate must be taken into consideration when calculating the amount of first polyol (i) and second polyol (ii).

The base polyether polyol should have a molecular weight of about 2000 to about 10,000, preferably 2,500 to about 7,000 and more preferably about 3000 to about 4,000. The base polyether polyol should further have an ethylene oxide content of less about 50%, preferably less than about 25%, and more preferably less than about 10%. The base polyether polyol may be the same as or different from the polyether polyols utilized as first polyol (i). Suitable polyether polyols include those discussed above with reference to first polyol (i).

Suitable materials useful as the dispersed particulate organic polymer (iii) include styrene/acrylonitrile, styrene/ butadiene, polyurea polymer polyols and polyisocyanate polyol (PIPA) adducts, i.e. adducts of isocyanates and triethanolamines as disclosed in U.S. Pat. No. 5,292,778 which is incorporated herein by reference.

Examples of commercially available materials suitable for use as (iii) the dispersed organic particulate polymer (in a polyether polyol) include ARCOL® HS-100 styrene/ acrylonitrile polymer polyol; and RUBINOL® F4 17 polyamine polyisocyanate addition product containing polyether polyol.

In practice, the optional use of organic particulate polymer (iii) in isocyanate-reactive component (a) may require special consideration when calculating the amounts of components (i),(ii) and (iii). When the organic particulate polymer is dispersed in a polyether polyol which is the same as first polyol (i), that polyol must be considered as part of the total content of first polyol (i). Furthermore, the amount of organic particulate polymer (iii) must be taken into account when determining the amount of second polyol (ii) to be used. As the main funtion of second polyol (ii) is to increase the load beating characteristics of the present foams, the addition of organic particulate polymer, also a very efficient load or modulus builder, allows the use of lower levels of second polyol (ii).

The most preferable manner of determining the composition of isocyanate-reactive component (a) when organic particulate polymer (iii) is used, is by reference to the following formula:

$$i+ii+x=100$$

$$i=(z)(100)-[(iii/y)(100)(1-y)]$$

$$ii=(100)-[(100)(z)+(iii)(100)]$$

$$x=(iii/y)(100)$$

where:
iii=the organic particulate polymer content in isocyanate-reactive component (a) expressed as a weight fraction x=parts by weight of polyether polyol containing the organic particulate polymer (iii)

y=the weight fraction of organic particulate polymer contained in the polymer polyol used to supply (iii)

z=the weight fraction of total polyether polyol in (i)

For example:

For a composition containing 22.5% of organic particulate polymer (iii) based on the weight of (a); where the polymer polyol used to supply (iii) contains 45% of the organic particulate polymer and the Polyol (i) contains 40% of polyether polyols, then:

$$i=(0.4)(100)-[(0.225/0.45)(100)(1.045)]=40-27.5=12.5$$

$$ii=100-[(100)(0.4)+(0.225)(100)]=100-(40+22.5)=37.5$$

$$x=(0.225/0.45)(100)=50$$

This isocyanate-reactive component will then contain 12.5% of first polyol (i); 37.5% of second polyol (ii) and 50% of the polymer polyol containing organic particulate (iii).

According to the process of the present invention, isocyanate-reactive component (a) is reacted with polyisocyanate component (b). The polyisocyanate component useful in the present invention comprises about 40 to about 70%, preferably about 50 to about 60% and more preferably about 50 to about 55% of diphenylmethane diisocyanate. The polyisocyanate component further comprises 30 to 60%, preferably about 50 to 40% and more preferably about 45 to 50 % of the polyphenylmethane isocyanate. The polyisocyanate component may optionally comprise less then 15% of one or more of other isocyanate species, including aliphatic, cycloaliphatic, or aromatic polyisocyanates, e.g., 1,6-hexamethylene diisocyanate; 1,4-cyclohexane diisocyanate; and 2,4'- and 2,6'-toluene diisocyanate. Isocyanate variants, such as isocyanates modified in a known manner by the introduction of, e.g., allophanate, urea, biuret, carbodiimide, uretonimine and isocyanurate resins, may also be included in present polyisocyanate component (b).

The diphenylmethane diisocyanate utilized in polyisocyanate component (b) may be either the 2,4'- or the 4,4'-isomer or may be a mixture of the two. Preferably, the diphenylmethane diisocyanate comprises more than about 50%, preferably more than about 80% and more preferably more than about 90% of the 4,4'-isomer. The polyphenylmethylene isocyanates utilized in polyisocyanate component (b) is often referred to as "crude" or "polymeric" MDI. Such compositions are manufactured by the phosgenation of amine mixtures obtained from the condensation of aniline and formaldehyde in appropriate proportions. For purposes of this invention, polymeric MDI containing higher oligimers containing three rings or more is particularly suitable. The polyisocyanate component (b) useful in the present invention should have an average isocyanate functionality of about 2.0 to about 3.5, preferably about 2.2 to about 3.0 and more preferably about 2.4 to about 2.7.

Commercially available polyisocyanate compositions suitable for use in polyisocyanate component (b) include the RUBINATE® series of polymeric polyisocyanates available from ICI Americas Inc.

The process according to the present invention further comprises reacting components (a) and (b) with water (c) as a blowing agent. Water is used in an amount of about 1 to about 7 parts by weight per 100 parts by weight of isocyanate-reactive component (a). Preferably, the amount of water used in the present process is about 3 to about 5 parts by weight per 100 parts by weight of isocyanate-reactive component (a).

The present process may preferably comprise reacting components (a), (b) and (c) in the presence of additional materials, auxiliaries and additives known to those skilled in the art. For example, it may be desirable to include foam stabilizing surfactants, catalysts, flame retardants, antistatic agents etc., in the process in order to provide properties and characteristics needed for a particular purpose.

Surfactants which may be used in the present process include those known in the art such as polydimethyl siloxanes, polydimethyl siloxane block copolymers and alkyl-pendant dimethylsiloxanes. Such materials are available commercially, e.g., as NIAX® L-603, NIAX® L-540 and NIAX® L-620 organosilicone surfactants available from OSi Specialties and TEGOSTAB® BF-2370, B8228 and B8001 silicone surfactants available from Goldschmidt.

The present process may also contain various catalysts or catalyst combinations known to those skilled in the art for use in such processes. Examples of suitable catalysts include tertiary amine catalysts, such as N,N-dimethylethanolamine, bis(dimethylaminoethyl) ether and 1,4-diazobicyclo[2,2,2] octane; tin catalysts such as stannous octoate, and dibutyl tin dilaurate; other organometallic catalysts, such as bismuth carboxylates, zinc carboxylates and potassium-2-ethyl hexanoate. Commercially available catalysts suitable for use in the present invention include, e.g., NIAX® C-183 amine catalyst available from OSi Specialties and DABCO® T-10 stannous octoate catalyst available from Air Products.

Other additives may optionally be incorporated in the process of the present invention, such as stabilizers/crosslinkers, flame retardants, antistatic agents, fillers, pigments, dyes, antioxidants, etc. Examples of suitable stabilizers/crosslinkers include diethanolamine, dipropylene glycol, diethylene glycol, ethylene glycol, and 1,4-butandiol; suitable flame retardants include melamine, zinc borate, aluminum trihydrate, tris(chloropropyl)-phosphate, pentabromodiphenyl oxide and mixtures thereof; suitable antistatic agents include quaternary ammonium salts, alkali metal thiocyanates, metal salts of fluoroalkyl sulfonic acids, and neoalkoxy and zirconate organometallics; suitable fillers include calcium carbonate, barium sulfate, clay and talc; and suitable antioxidants include BHT, alkylated diphenylamine, and mixtures of alkylated and arylated diphenylamines.

When desired, such additives and auxiliaries will be used in mounts necessary to achieve a particular result. The required mounts of these materials will be evident to one skilled in the art from the present disclosure.

The process of the present invention comprises reacting components (a), (b) and (c) at an index of about 90 to about 130, preferably about 100 to about 120 and more preferably about 100 to about 110. The 'isocyanate index' or 'NCO index' as used herein means the ratio of NCO groups to the isocyanate-reactive hydrogen atoms present in the isocyanate-reactive material, given as a percentage:

$$\frac{[NCO] \times 100}{[active\ hydrogen]} = (\%)$$

In other words, the NCO index expresses the ratio of isocyanate groups to isocyanate-reactive groups.

Processes known to those skilled in the art of producing polyurethane foam can be used in practicing the present invention. In general, when preparing a polyurethane foam in accordance with the present invention, the polyisocyanate component is contacted, under foam forming conditions, with the isocyanate-reactive component in the presence of water and any other additives used. In practicing the present process, metering/dispensing equipment can be either of the low or high pressure variety; mixing can be mechanical or by high pressure impingement, with or without self cleaning; product fabrication can be accomplished by a continuous process, i.e., slabstock, or via lamination, a discontinuous process, or batch block; a molding process where the material is overpacked in a restricted volume or an encapsulation process may also be used. Suitable manufacturing procedures are described, e.g., in "Polyurethane Handbook", Gunther Oertel, Hanser Publishers, Munich, (1985).

The present process may be conducted by the known one-shot, semi-prepolymer or full prepolymer techniques with conventional mixing equipment. However, the one-shot technique is preferred. Prepolymers may be used by prere-action of the isocyanate with a polyol to result in NCO values of about 10 to about 30%, as long as the appropriate corrections are made to the mount of the first base polyols (i) and the second polyol (ii) contained in isocyanate-reactive component.

The present invention is useful in preparing open-celled polyurethane foams suitable for packaging applications. The present open-celled polyurethane foams have a density in the range of about 1.5 to about 5.0 pcf, preferably about 2.0 to about 3.0 pcf. The present foams have a G value of about 30 to about 80 over a static load range of 1.0 to 2.0 psi at 2 inch foam thickness and 24 inch drop height. Preferably, the present open celled polyurethane foams have a G value of about 30 to about 60 over a static load range of about 1.0 to about 2.0 psi at the same drop and sample thickness conditions.

The open-celled polyurethane foams according to the present invention have an airflow in the range of about 0.05 to about 0.5 scfm, preferably about 0.1 to about 0.3 scfin, and a cell size of about 30 to about 80 cells per linear inch.

The open-celled polyurethane foam of the present invention further have a 25% compressive strength of 4.0 psi or more and preferably about 5.0 psi or more as measured by the ASTM 3575D3 procedure.

The open-celled polyurethane foams produced in accordance with the present invention are useful for packaging very fragile and delicate articles such as those having a G value ratings of about 25 to about 80 at a static load range of 1.0 to 2.0 psi and a weight range of approximately 10 to 150 lb. Accordingly, the present materials demonstrate excellent shock absorbing and load bearing characteristics.

The present invention will now be illustrated by reference to the following specific, non-limiting examples.

EXAMPLES

Example 1 (Samples 1–7)

Polyurethane foam samples 1–7 were prepared by hand mixing the ingredients set forth in Table 1 at ambient temperature, in a quart cup using a 310 gram total batch size. The polyols, surfactant and amine catalysts were added to a quart cup and hand stirred with a wooden spatula till uniform. Then, the tin catalyst was added by syringe to this premixture. Next, the isocyanate component was rapidly added to the premixture. Mixing was immediately initiated with simultaneous addition of the water by syringe. A 3 inch high shear Conn & Company mix blade installed on a Sears & Roebuck drill press run at 2400 rpm accomplished homogeneous mixing. After 12 seconds of total mixing time, the batch was rapidly poured into a two gallon polyethethylene payliner, the foaming reaction proceeded and the foam was allowed to free rise. The foams were then allowed to cure for 24 hours before being cut and tested according to the test methods set forth in Table I. The results are summarized in Table I.

TABLE I

|  | Test Method ASTM | ETHAFOAM ® 220 | Foam 1 | Foam 2 | Foam 3 | Foam 4 | Foam 5 | Foam 6 | Foam 7 |
| --- | --- | --- | --- | --- | --- | --- | --- | --- | --- |
| ARCOL ® 3020 |  |  | 40 |  |  | 34.5 | 18.5 | 9.5 |  |
| POLY ® G 30-56 |  |  |  |  | 40 |  |  |  |  |
| RUBINOL ® F-428 |  |  |  | 40 |  |  |  |  |  |
| ARCOL ® LG-168 |  |  | 60 | 60 | 60 | 55.5 | 46.5 | 40.5 | 33.5 |

TABLE I-continued

|  | Test Method ASTM | ETHAFOAM® 220 | Foam 1 | Foam 2 | Foam 3 | Foam 4 | Foam 5 | Foam 6 | Foam 7 |
|---|---|---|---|---|---|---|---|---|---|
| ARCOL® S-100 |  |  | 0 | 0 | 0 | 10 | 35 | 50 | 66.5 |
| NIAX® C-183 |  |  | 0.4 | 0.4 | 0.4 | 0.4 | 0.4 | 0.4 | 0.4 |
| NIAX® L-603 |  |  | 0.5 | 0.5 | 0.5 | 0.5 | 0.5 | 0.5 | 0.5 |
| DABCO® T-10 |  |  | 0.35 | 0.35 | 0.35 | 0.35 | 0.35 | 0.35 | 0.35 |
| H₂O |  |  | 3.6 | 3.6 | 3.6 | 3.86 | 3.45 | 3.45 | 3.45 |
| RUBINATE® 7910 |  |  | 81.2 | 79.18 | 81.2 | 83.77 | 73.84 | 71.25 | 68.34 |
| % of Organic Particulate |  |  | 0 | 0 | 0 | 4.5 | 15.75 | 22.5 | 29.93 |
| NCO Index |  |  | 100 | 100 | 100 | 100 | 100 | 100 | 100 |
| Density, pcf | D3574A-91 | 2.2 | 1.95 | 1.91 | 2.15 | 2.2 | 2.08 | 2.16 | 2.41 |
| 25% Comp. Str. | D3575D-93 | 10 | 4.97 | 6.38 | 6.11 | 5.79 | 6.77 | 7.98 | 9.56 |
| 50% Comp. Str. | D3575D-93 | 15 | 6.41 | 9.14 | 6.76 | 6.97 | 7.87 | 9.33 | 11.5 |
| Resilience, % | D3574H-91 |  | 20 | 22 | 16 | 18 | 18 | 18 | 21 |

Example 2 (Sample 8)

An open-celled polyurethane foam (Sample 8) according to the invention was prepared on a commercial maxfoam continuous slabstock machine. Maxfoam equipment consists of the metering and delivery of the individual formulation components to a mechanical mixing 'mixhead' where the foam reaction commences and then the reaction mixture is dispensed onto a moving substrate on a powered conveyor with sidewalls to form a block. Dispensing was accomplished by means of a trough, which provided a 15 to 20 second delay of the reaction mixture onto the moving substrate. The reaction mixture was dispensed onto the moving substrate over a series of adjustable fall plates coveting a length of about 20 feet. The purpose of the fall plate region was to allow the foam to rise down over about 70% of its rise profile and to achieve 'flat topped' rather than domed or crowned buns. Throughputs were calculated on the basis of the desired bun width, height, and density and a conveyor speed necessary for getting the gellation phase of the reaction to occur after the fall plate region and on the horizontal section of the moving conveyor. In order to control the number of cells per linear inch, nucleating air or nitrogen was added to the mix head. On the basis of the above process parameters, the following conditions produced a high quality nominal 2.2 pcf packaging foam with the desired drop curve packaging performance: total formulation thruput 267 lbs., mixer speed 1500 rpm, isocyanate injectors set at 750 psi, head pressure at 5 psi, nucleating nitrogen at 70 ml/min and conveyor line speed at 14 ft/min. A 22 inch height bun was achieved with a cell structure of 70 cells/inch and an airflow of about 0.2 scfm.

Example 3 (Samples 9–17)

Samples 9–17 were prepared on a laboratory scale low pressure metering/dispensing equipment consisting of a modified Martin Sweets machine. This machine has the capability to separately meter 5 components. In this case, the isocyanate-reactive component (a) and the amine catalysts were preblended and metered as one component. The water, tin catalyst, surfactant and isocyanate component (b) were also metered as separate components. A total formulation thruput of about 30 lbs/rain was utilized. A 300 cc free volume pin mixer was operated at 3000 rpm to provide a homogenous high quality mix. Box pours of 20"×20"×10" were accomplished by discontinuous pours consisting of a 3 second waste shot to account for component stream equilibration (i.e., steady state) followed by 10 additional seconds of pouring time. The box foams were allowed to cure for 24 hours. The foams were then removed from the box and cut into blocks for testing. The test methods used and physical property results are summarized in Table II.

TABLE II

|  | Test Method ASTM | ETHAFOAM® 220 | Foam 8 | Foam 9 | Foam 10 | Foam 11 | Foam 12 | Foam 13 | Foam 14 | Foam 15 | Foam 16 | Foam 17 |
|---|---|---|---|---|---|---|---|---|---|---|---|---|
| ARCOL® 3020 |  |  | 40 | 26.5 | 26.5 | 26.5 | 12.5 | 12.5 | 12.5 | 125 | 12.5 | 12.5 |
| ARCOL® LG-168 |  |  | 60 | 48.5 | 48.5 | 48.5 | 37.5 | 37.5 | 37.5 | 37.5 | 3.75 | 37.5 |
| ARCOL® HS-100 |  |  | 0 | 25 | 25 | 25 | 50 | 50 | 50 | 50 | 50 | 50 |
| NIAX® C-183 |  |  | 0.4 | 0.4 | 0.4 | 0.4 | 0.4 | 0.4 | 0.4 | 0.4 | 0.4 | 0.4 |
| NIAX® L-603 |  |  | 0.5 | 0.5 | 0.5 | 0.5 | 0.75 | 0.75 | 0.75 | 0.85 | 0.85 | 0.85 |
| DABCO® T-10 |  |  | 0.35 | 0.35 | 0.35 | 0.35 | 0.35 | 0.35 | 0.35 | 0.35 | 0.35 | 0.35 |
| DEOA |  |  |  |  |  |  |  |  |  | 0.5 | 0.5 | 0.5 |
| H20 |  |  | 3.6 | 3.47 | 3.47 | 3.47 | 3.45 | 3.45 | 3.45 | 4.35 | 4.35 | 4.35 |
| RUBINATE® 7910 |  |  | 81.2 | 75.27 | 82.79 | 90.32 | 70.47 | 77.05 | 84.56 | 85.47 | 94.02 | 102.56 |
| % of Organic Particulate (iii) |  |  | 0 | 11.25 | 11.25 | 11.25 | 22.5 | 22.5 | 22.5 | 22.5 | 22.5 | 22.5 |
| NCO Index |  |  | 100 | 100 | 110 | 120 | 100 | 110 | 120 | 100 | 110 | 120 |
| Density, pcf | D3574-91A | 2.2 | 2.21 | 2.27 | 2.21 | 1.97 | 2.35 | 2.35 | 2.43 | 1.88 | 1.96 | 1.91 |
| 25% Comp. Str. | D3575D-93 | 10 | 4.38 | 5.07 | 7.48 | 7.23 | 5.93 | 7.18 | 10.8 | 8.36 | 9.89 | 12.1 |
| 50% Comp. Str | D3575D-93 | 15 | 5.15 | 5.99 | 8.33 | 7.9 | 7.01 | 8.32 | 13.2 | 8.87 | 10.8 | 12.6 |
| Tensile Str, psi | D3574E-91 |  | 30.3 | 35.3 | 51.9 | 26.7 | 60.8 | 63.6 | 35.4 | 56.5 | 55 | 54.5 |
| Elongation, % | D3574E-91 |  | 74 | 61 | 34 | 45 | 42 | 33 | 37 | 27 | 21 | 15 |
| Die C Tear, pli | D624-91 |  | 4.33 | 4.7 | 7.1 | 4.4 | 6.7 | 7.8 | 5.5 | 7.3 | 7 | 7.2 |
| 50% RT Comp. Set | D3575B-93 |  | 8 | 15.4 | 31.5 | 38.1 | 15.3 | 20.1 | 34.4 | 32.6 | 32.9 | 36.7 |

TABLE II-continued

|  | Test Method ASTM | ETHAFOAM® 220 | Foam 8 | Foam 9 | Foam 10 | Foam 11 | Foam 12 | Foam 13 | Foam 14 | Foam 15 | Foam 16 | Foam 17 |
|---|---|---|---|---|---|---|---|---|---|---|---|---|
| Resilience % | D3574H-91 |  | 17 | 12 | 27 | 11 | 21 | 14 | 14 | 27 | 34 | 14 |
| Airflow, scfm | D3574G-91 |  | 0.2 | 0.21 | 0.08 | 0.05 | 0.21 | 0.21 | 0.17 | 0.05 | 0.06 | 0.04 |

G-Value Testing

The dynamic cushioning (G-value) testing of Foam Samples 8, 10, 13, 16 and 17 were tested according to the procedure set forth in ASTMD-1596. Eight inch square foam samples were tested at a 2 inch thickness. Each sample was subjected to 5 drops at each of 5 static loads (0.25, 0.5, 1.0, 1.5 and 2.0 psi). A new foam sample was used at each static load tested.

The G values reported in Table III are the 1st drop and the average of drops 2–5. The magnitude of difference between the first drop and the 2–5 drop value provides an indication of the ability of the material to maintain a certain performance level.

RUBINATE® 7910 is a polymeric diphenylmethane diisocyanate available from ICI Americas Inc.

Accordingly, it can be seen from the results set forth in Tables I and II that the foams prepared in accordance with the present invention have a relatively low density while maintaining the excellent physical properties, such as compressive strength, required of energy absorbing foam. Table III demonstrates that the foams of the present invention have G values within the desired range of 30 to 80 over a 1.0 to 2.0 psi static lead range. The physical properties and G values are superior or comparable to polyethylene foams.

The present invention may be embodied in other specific forms without departing from the spirit and essential attributes thereof and accordingly, reference should be made

TABLE III

|  | Static Load (psi) | Foam 8 | Foam 10 | Foam 13 | Foam 16 | Foam 17 | ETHAFOAM® 220 |
|---|---|---|---|---|---|---|---|
| Drop 1 | 0.25 | 63.4 | 74.9 | 74.4 | 82 | 83.1 | 45.9 |
|  | 0.5 | 35.9 | 45.9 | 40.2 | 44.1 | 43.8 | 37 |
|  | 1 | 33.8 | 31 | 30.9 | 30.8 | 30.1 | 37.4 |
|  | 1.5 | 39.4 | 33.8 | 34.2 | 34.5 | 47.2 | 46.7 |
|  | 2 | 52.7 | 38.6 | 38.2 | 56.4 | 37.9 | 53.8 |
| Avg Drops 2–5 | 0.25 | 60 | 73.3 | 70.6 | 72.8 | 79.4 | 49.9 |
|  | 0.5 | 38 | 45.3 | 42.8 | 45 | 47 | 41.8 |
|  | 1 | 39.7 | 39.7 | 36.4 | 40.7 | 42.5 | 43.3 |
|  | 1.5 | 48.9 | 49.2 | 47.3 | 54 | 62.1 | 54.6 |
|  | 2 | 72 | 60 | 59.8 | 69.1 | 77.2 | 65.2 |

ARCOL® F-3020 is a 3000 molecular weight polyoxyalkylene (less than 8% polyoxyethylene) polyether triol having a hydroxyl number of 56, available from Arco Chemical Company.

ARCOL® LG-168 is a 1000 molecular weight polyoxypropylene triol having a hydroxyl number of 168 available from Arco Chemical Company.

ARCOL® HS-100 is a nominal 45% styrene/acrylonitrile polymer polyol having a molecular weight of about 3250 and a hydroxyl number of 28.2 available from Arco Chemical Company.

POLY G® 30-56 is a 3000 molecular weight polyoxypropylene triol having a hydroxyl number of 56 available from Olin Chemicals.

RUBINOL® F428 is a 6000 molecular weight polyoxypropylene-oxyethylene triol having an ethylene oxide of about 15%, a molecular weight of approximately 600 and a hydroxyl number of 28 available from ICI Americas Inc.

NIAX® C-183 is an amine catalyst available from OSi Specialties Inc.

NIAX® L-603 is an alkyl-pendant organosilicone surfactant available from OSi Specialties Inc.

DABCO® T-10 is 50% stannous octoate in dioctyl phthalate (DOP) catalyst available from Air Products and Chemicals.

NIAX® DEOA is a 99% diethanolamine is used for crossing and stabilizing flexible urethane foams available from OSi Specialties Inc.

to the appended claims, rather than to the foregoing specification, as indicating the scope of the invention.

We claim:

1. An open-celled polyurethane foam having a density of 1.5 to 5.0 pcf, a G value of 30 to 80 over a static load range of 1.0 to 2.0 psi based on a 2.0 inch thickness and a 24 inch drop height, an airflow in the range of 0.05 to 0.5 scfm and a 25% compressive strength of 4.0 psi or more prepared by a process comprising reacting, under foam forming conditions:
   (a) an isocyanate-reactive component comprising
      (i) 20 to 80% of a first polyol selected from the group consisting of polyether diols, polyether triols and mixtures thereof having a molecular weight of 2000 to 10,000 and an ethylene oxide content of less than 50%; and
      (ii) 80 to 20% of a second polyol selected from the group consisting of polyether diols, polyether triols, polyester diols, polyester triols and mixtures thereof having a molecular weight of 300 to 1500 and an ethylene oxide content of less than 50%;
   (b) a polyisocyanate component comprising 40 to 70% of diphenylmethane diisocyanate and 30 to 60% of polyphenylmethylene isocyanate, wherein said diphenylmethane diisocyanate comprises more than 50% by weight of the 4,4'-isomer; and
   (c) water in an mount of 1 to 7 parts by weight per 100 parts by weight of component (a),
   wherein components (a), (b) and (c) are reacted at an index of 90 to 130.

2. A foam as in claim 1, wherein said first polyol has an ethylene oxide content of less than 25%.

3. A foam as in claim 1, wherein said second polyol has an ethylene oxide content of less than 25%.

4. A foam as in claim 1, wherein said first polyol has a molecular weight of 2500–7000.

5. A foam as in claim 1, wherein said second polyol has a molecular weight of 600–1200.

6. A foam as in claim 1, wherein said isocyanate-reaction component (a) comprises 30 to 50 percent of said first polyol (i) and 70 to 50 percent of said second polyol (ii).

7. A foam as in claim 1, wherein said polyisocyanate component comprises 50 to 60% of diphenylmethane diisocyanate.

8. A foam as in claim 6, wherein said polyisocyanate component comprises 50 to 55% of diphenylmethane diisocyanate.

9. A foam as in claim 1, wherein said diphenylmethane diisocyanate comprises more than 80% of the 4,4'-isomer.

10. A foam as in claim 1, wherein components (a), (b) and (c) are reacted at an index of 100 to 120.

11. A foam as in claim 1, wherein said isocyanate-reactive component (a) further comprises:

(iii) from 2 to 40 weight percent, based on the total weight of isocyanate-reactive component (a), of a particulate organic polymer dispersed in a polyether polyol which may be the same as or different from first base polyol (i).

12. A foam as in claim 11, comprising 10 to 40 weight percent, based on the total weight of isocyanate-reactive component (a) of said dispersed particulate organic polymer (iii).

13. A foam as in claim 12, comprising 15 to 40 weight percent, based on the total weight of the isocyanate-reactive component (a), of said dispersed particulate organic polymer (iii).

14. A foam as in claim 10, wherein said isocyanate-reactive component (a) comprises 30 to 50% of said first polyol (i) 70 to 50% of said second polyol (ii) and 10 to 40% of said dispersed particulate organic polymer (iii).

15. A foam as in claim 10, wherein particulate organic polymer is selected from the group consisting of styrene/acrylonitrile, polyurea and polyisocyanate polyol adduct in a base polyether polyol having a molecular weight of 2000 to 10,000 and an ethylene oxide content of less than 50%.

16. An open-celled polyurethane foam as in claim 1, having a density in the range of 2.0 to 3.0 pcf.

17. An open-celled polyurethane foam as in claim 11, having a G value of 3 to 60 over a static load range of 1.0 to 2.0 psi based on a 2.0 inch thickness and a 24 inch drop height.

18. An open-celled polyurethane foam as in claim 11, having a 25% compressive strength of 5.0 psi or more.

* * * * *

UNITED STATES PATENT AND TRADEMARK OFFICE
CERTIFICATE OF CORRECTION

PATENT NO. : 5,698,609
DATED : Dec. 16, 1997
INVENTOR(S) : Lockwood et al

It is certified that error appears in the above-identified patent and that said Letters Patent is hereby corrected as shown below:

Column 3, line 43, after "include" delete "AKCOL®", and insert --ARCOL®--; Column 3, line 46, after "and", and before "F428" delete "KUBINOL®", and insert --RUBINOL®--;

Column 3, line 58, after "about" and before "It is", delete "10 %" and insert --10%--; Column 8, line 3, after "made to the" and before "of the first", delete "mount", and insert --amount--; Column 9, line 31, delete "coveting" and insert --covering--; Column 10, line 35, after "30" and before "was utilized", delete "lbs/rain", and insert --lbs/min--; Column 11, line 66, delete "crossing" and insert --crosslinking--;

Claim 1 line 64, delete "mount" and insert --amount--;

Signed and Sealed this

Twenty-third Day of March, 1999

Attest:

Q. TODD DICKINSON

Attesting Officer

Acting Commissioner of Patents and Trademarks